United States Patent
Greenfeld (10) Patent No.: US 8,022,634 B2
(45) Date of Patent: Sep. 20, 2011

(54) METHOD AND SYSTEM FOR DIMMING AC-POWERED LIGHT EMITTING DIODE (LED) LIGHTING SYSTEMS USING CONVENTIONAL INCANDESCENT DIMMERS

(75) Inventor: Fred Greenfeld, Nederland, CO (US)

(73) Assignee: Intersil Americas Inc., Milpitas, CA (US)

( * ) Notice: Subject to any disclaimer, the term of this patent is extended or adjusted under 35 U.S.C. 154(b) by 364 days.

(21) Appl. No.: 12/366,642

(22) Filed: Feb. 5, 2009

(65) Prior Publication Data

US 2009/0195168 A1    Aug. 6, 2009

Related U.S. Application Data

(60) Provisional application No. 61/063,722, filed on Feb. 5, 2008.

(51) Int. Cl.
*G05F 1/00* (2006.01)
*H05B 37/02* (2006.01)

(52) U.S. Cl. ............ 315/192; 315/185 R; 315/291; 315/294; 315/297; 315/308

(58) Field of Classification Search ............ 315/185 R, 315/192, 195, 200 R, 201–207, 210, 250, 315/272, 291, 294, 297, 308, 312

See application file for complete search history.

(56) References Cited

U.S. PATENT DOCUMENTS

| | | | |
|---|---|---|---|
| 7,656,103 B2 * | 2/2010 | Shteynberg et al. | 315/312 |
| 7,759,881 B1 * | 7/2010 | Melanson | 315/307 |
| 7,804,256 B2 * | 9/2010 | Melanson | 315/291 |
| 7,843,148 B2 * | 11/2010 | Gater et al. | 315/291 |
| 7,902,769 B2 * | 3/2011 | Shteynberg et al. | 315/291 |
| 2008/0224625 A1 | 9/2008 | Greenfeld | |
| 2010/0225249 A1 * | 9/2010 | Liao et al. | 315/297 |
| 2010/0289424 A1 * | 11/2010 | Chang et al. | 315/250 |

* cited by examiner

*Primary Examiner* — Vibol Tan
(74) *Attorney, Agent, or Firm* — Paul A. Bernkopf; Graybeal Jackson LLP; Paul F. Rusyn (57) ABSTRACT

A dimming control circuit for dimming light emitting diodes receives an AC input voltage signal from a dimming circuit. The control circuit includes a power stage and a current control loop coupled to the power stage. An AC detector is operable to detect an instantaneous value of the AC input voltage signal and to generate a signal indicating whether the AC input voltage signal is present or absent. A current control circuit is operable responsive to the signal to adjust the operation of the current control loop and to control current through the light emitting diodes to achieve the desired dimming, and to prevent inrush current on the AC input voltage signal.

20 Claims, 3 Drawing Sheets

METHOD AND SYSTEM FOR DIMMING AC-POWERED LIGHT EMITTING DIODE (LED) LIGHTING SYSTEMS USING CONVENTIONAL INCANDESCENT DIMMERS

PRIORITY CLAIM

The present application claims the benefit of copending U.S. Provisional Patent Application Ser. No. 61/063,722, filed Feb. 5, 2008, which application is incorporated herein by reference in its entirety.

TECHNICAL FIELD

Embodiments of the present invention relate generally to lighting systems, and more specifically to light emitting diode (LED) lighting systems.

BACKGROUND

Conventional incandescent lighting systems utilize dimming control circuits or dimmers to adjust the intensity or brightness of light provided by the system. A conventional dimmer works by adjusting the portion of an alternating current (AC) half wave that is supplied to the incandescent light being powered. Such an AC signal is a sinusoidal AC power signal and the "half wave" of the signal corresponds to this sinusoidal signal during half the period of the signal, as will be understood by those skilled in the art. The portion of the AC power signal that is actually supplied through the dimmer to an incandescent light or other load being powered is commonly referred to as the "conduction angle" of the AC power signal. To control the brightness of the light provided by the system the dimmer reduces the portion of each AC half wave that is supplied to the light and thereby controls the root-mean-square (RMS) voltage supplied to the light. The RMS voltage supplied to the light determines the brightness of the light being provided and in this way the dimmer controls the brightness.

In light emitting diode (LED) lighting systems, which are becoming popular replacements for conventional incandescent lighting systems, control circuitry operates to maintain a desired average current supplied to the LEDs being powered to thereby achieve the desired illumination. These control systems maintain the desired average current independent of variation in the supplied AC input voltage. As a result, conventional dimmers cannot be utilized with these LED control circuits since the control circuits will simply adjust the current supplied to the LEDs to maintain the desired average current in response to changes in the AC input voltage caused by the dimmer. It is, however, desirable to utilize conventional dimmers with such LED lighting systems to provide compatibility of LEDs with existing incandescent lighting systems.

SUMMARY

According to one embodiment of the present invention, a dimming control circuit for dimming light emitting diodes receives an AC input voltage from a dimming circuit. The control circuit includes a power stage and a current control loop coupled to the power stage. An AC detector is operable to detect an instantaneous value of the AC input voltage signal and to generate a signal indicating whether the AC input voltage signal is present or absent. A current control circuit is operable responsive to the signal to adjust the operation of the current control loop and to control current through the light emitting diodes to achieve the desired dimming, and to prevent inrush current on the AC input voltage signal. The control circuit can control a single string of LEDs or multiple parallel-connected strings of LEDs.

DETAILED DESCRIPTION

Figure 1:
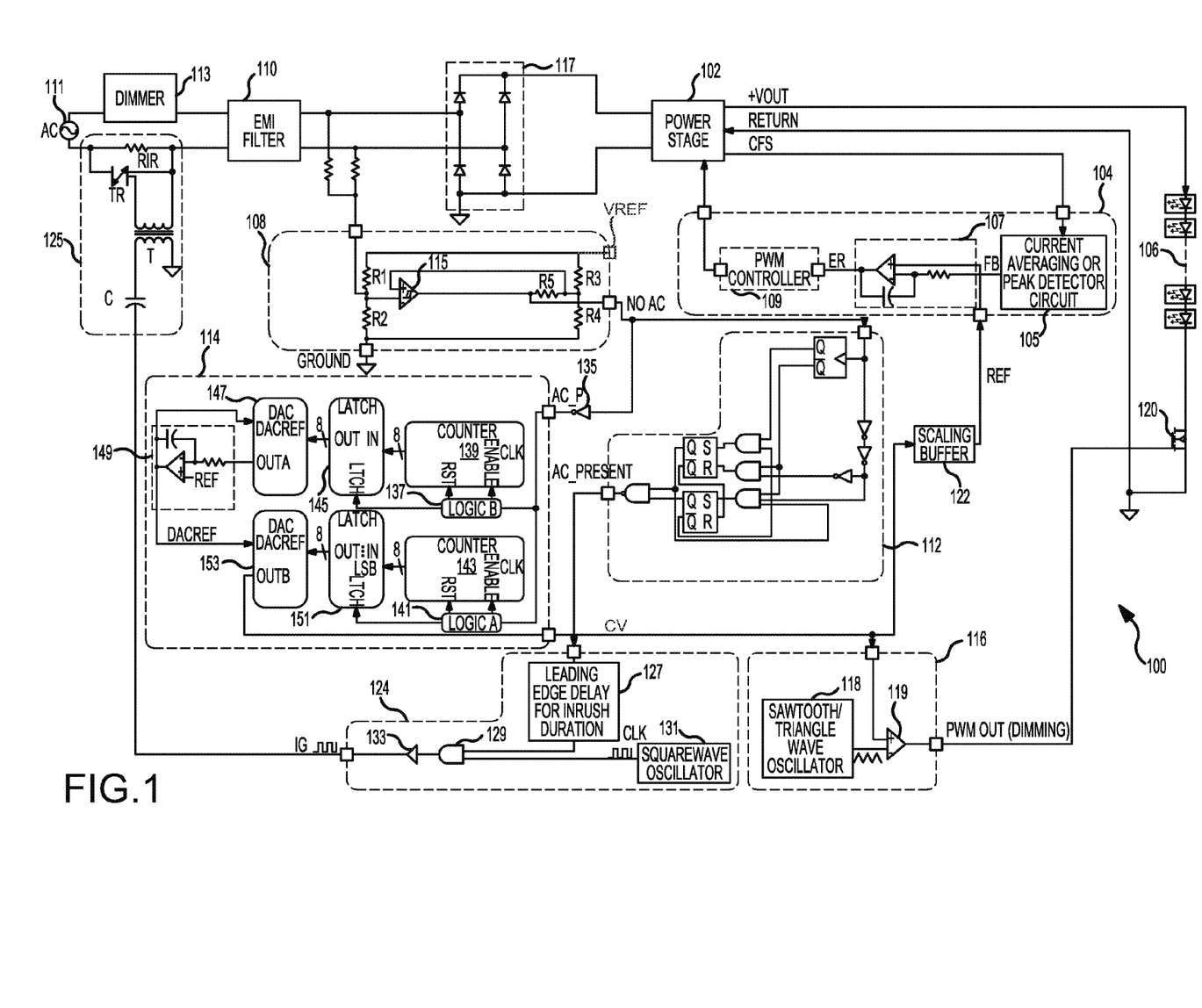
FIG. 1 is a functional block diagram of an LED control circuit that is compatible with conventional dimmer circuits for controlling a single string of LEDs according to one embodiment of the present invention.

FIG. 1 is a functional block diagram of an LED control circuit 100 that is compatible with a conventional dimmer circuit according to one embodiment of the present invention. The LED control circuit 100 includes a power stage 102 and current control loop 104 that operate in combination to maintain a desired average current through a single string of LEDs 106. These components may have a variety of different topologies, such as a Buck Converter for the power stage, and example embodiments of these components are described in more detail in U.S. patent application Ser. No. 12/002,611, entitled CONSTANT CURRENT LIGHT EMITTING DIODE (LED) DRIVER CIRCUIT AND METHOD, which is incorporated herein by reference.

The current loop control circuit 104 includes an averaging or peak detector circuit 105 that receives a current feedback signal CFS developed by the power stage 102. In response to the CFS signal, the detector circuit 105 develops an output signal FB indicating the average or peak value of a current flowing through a switching device (not shown) in the power stage 102. The FB signal is applied to an integrator 107 that integrates the difference between the FB signal and a reference signal REF to generate a corresponding error signal ER. The error signal ER is output to a PWM controller 109 which uses the error signal ER to generate pulse width modulated control output signals that are applied to the power stage 102 to control the turning ON and OFF of switching devices (not shown) in the power stage and thereby provide a pulse width modulated current IOUT to the single string of LEDs 106. Those skilled in the art will understand the detailed operation of the PWM controller 109 and the overall detailed operation of the power stage 102, which may be a Buck converter, for example. Therefore, for the sake of brevity, the overall operation and theory of operation of these components will not be described in more detail herein.

The control circuit 100 further includes an AC detector 108 that detects when the instantaneous value of an AC input voltage applied through an EMI filter 110 drops below a threshold value. An AC power source 111 supplies a sinusoidal AC power signal through a dimmer circuit 113 to the EMI filter 110 which, in turn, filters this AC power signal and outputs a filtered sinusoidal AC power signal to provide power to the LED control circuit 100. The AC detector 108 includes a comparator 115 and resistors R1-R5 configured as shown that function to generate a NO_AC signal that is inactive low when the filtered AC power signal from the filter 110 is present and is active high when no such AC power signal is present. No filtered AC power signal is present during zero-crossings of the filtered AC power signal such as normally occur due to the sinusoidal nature of the AC power signal and filtered AC power signal. The filtered AC power signal also is not present during portions of AC half waves of the filtered AC power signal where the dimmer circuit 113 has removed a portion of the AC half waves. The dimmer circuit 113 works by adjusting the portion of the AC power signal from the AC power source 111 that is supplied to the control circuit 100. The NO_AC signal is a pulse width modulated signal indicating a proportion of each AC half wave for which the filtered AC power signal exceeds a threshold value established by the detector 108. The filtered AC power signal from the filter 110 is applied through a full-wave rectifier 117 to supply a power signal to the power stage 102.

A zero-crossing blanking circuit 112 receives the NO_AC signal and generates an AC_Present signal that removes or "blanks out" a short period of time around each zero-crossing of the filtered AC power signal. In this way, the blanking circuit 112 functions to enable the control circuit 100 to ignore routine zero-crossings of the AC power signal that occur inherently with any sinusoidal signal so that the signal AC_Present accurately represents the portion of the AC power signal being supplied by the dimmer circuit 113. The zero-crossing blanking circuit 112 includes several flip-flops, inverters, and combinational logic gates interconnected as shown in one embodiment of the present invention.

In operation of the logic components in the blanking circuit 112, when the NO_AC signal transitions from a logic low ("0") to a logic high ("1"), a one-shot delay is triggered and its output goes high for a time slightly longer than the duration of a zero-crossing. The duration of a zero-crossing event is the time that the AC detector 108 indicates via the NO_AC signal that the filtered AC power signal is absent during a normal zero-crossing with full conduction of a half cycle of the power signal. The output of the blanking circuit 112, which is the signal AC_Present, remains a logic high for the duration of the one-shot delay. If the NO_AC signal remains a logic high beyond the duration of the one-shot delay, indicating the AC conduction angle of the filtered AC power signal is less than full conduction, the AC_Present signal transitions to a logic low. If the NO_AC signal returns to a logic low prior to the one-shot delay elapsing (i.e., prior to the one-shot timing out), indicating a normal zero-crossing, the AC_Present signal remains high, masking the zero-crossing event and causing the AC_Present signal to remain a logic high. Thus, only when the conduction angle is less than full conduction, meaning the NO_AC signal remains high for longer than the one-shot delay, will the AC_Present signal transition low to indicate a conduction angle of less than full conduction, less the blanking interval corresponding to the one-shot delay.

An inrush controller 124 receives the AC_Present signal and functions in response to the signal to control an inrush limiter circuit 125 to either insert or remove a resistance RIR in the input path of the AC power signal and thereby prevent large inrush currents from being drawn from the AC power source 111 due to capacitive components of the filter 110. The inrush control circuit 124 includes a leading edge delay circuit 127 that functions to delay the AC_Present signal and provide the delayed AC_Present signal to one input of an AND gate 129. A square wave oscillator 139 provides a clock signal CLK to the other input of the AND gate 129. In operation, the controller 124 inserts the resistance RIR in the input path of the AC power signal when the NO_AC signal indicates no filtered AC power signal is present for a predetermined time, meaning that the AC power signal being supplied by the power source 111 is not present for a predetermined time.

As long the NO_AC signal from the AC detector 108 goes inactive before a predetermined time, indicating the filtered AC power signal from the filter 117 is present, the leading edge delay circuit 127 maintains its output inactive, disabling the AND gate 129. If the NO_AC signal from the AC detector 108 does not go inactive before a predetermined time, indicating the filtered AC power signal from the filter 117 is not present for this time, the leading edge delay circuit 127 drives its output active, enabling the AND gate 129. When the AND gate 129 is enabled the AND gate drives its output through a buffer 133 to generate an inrush gate signal IG responsive to the CLK signal. The IG signal is supplied to the inrush limiter circuit 125 which, in response to the IG signal, places the resistor RIR in the path of the AC power signal from the power source 111 to limit inrush current. More specifically, the IG signal is supplied via a capacitor C to an input of a transformer T and in response to the IG signal the transformer drives a triac TR to turn OFF and thereby place the resistor RIR in the input path. During normal operation when the inrush control circuit 124 is not supplying the IG signal, the triac TR is turned ON to short circuit the resistor RIR, effectively removing the resistor from the input path.

A conduction angle to voltage converter 114, which is a low pass filter in the embodiment of FIG. 1, receives a second AC present signal AC_P in the form of the NO_AC signal applied through an inverter 135. In response to the second AC present signal, the conduction angle to voltage converter 114 generates a control voltage CV having a setpoint or value that is proportional to the AC conduction angle of the filtered AC power signal. The conduction angle corresponds to the portion of the AC power signal supplied by the dimming circuit 113 to the filter 110, as previously mentioned above. This may similarly be viewed as the control voltage CV having a value that is a function of the duty cycle of the AC_P signal.

The conduction angle to voltage transducer 114 is effectively a low pass filter that converts the AC_P signal to a DC value in the form of the control voltage CV. The AC_P signal is a low frequency pulse train with a frequency equal to twice the frequency of the AC line or power signal. The low pass filter 114 can be as simple as an RC filter or an active analog filter as is known in the art, but due to the low frequency of the AC_P signal a very low band-width filter is required to produce the desired CV signal. FIG. 1 illustrates a digitally implemented filter for the transducer 114. The advantage of using a digital filter is the CV signal is updated every half-cycle of AC power signal and responds much more quickly to changes in the frequency of the AC power signal than an analog filter can. Instead of filtering the AC_Present signal as would be the case for an analog filter embodiment of the conduction angle to voltage transducer 114, the digital filter embodiment uses the NO_AC signal as inverted by the inverter 135 to generate the second AC present signal AC_P.

The AC_P signal is applied through first logic circuitry 137 to control a full-scale counter 139 and is applied through second logic circuitry 141 to control a conduction angle counter 143. Each of the counters 139 and 143 receives a clock signal CLK of an appropriated frequency from a clock generator circuit (now shown in FIG. 1). The full scale counter 139 determines a full-scale count responsive to the AC_P signal, with the full-scale count value corresponding to the value of a full half cycle of the filtered AC power signal. As will be appreciated by those skilled in the art, the frequency of the AC power signal supplied by the power source 111, which is typically power being supplied from a utility company, will vary at different points in time, such as different times of day or times of the year. Thus, the full-scale counter 139 generates a full-scale count value that will vary as the frequency of the filtered AC power signal (i.e., as the frequency of the power source 111 varies). In this way the full-scale counter 139 develops the full-scale count having a value corresponding to the frequency of the filtered AC power signal.

The count generated by the full-scale counter 139 is stored in a latch 145. The logic circuitry 137 resets the latch 145 and counter 139 every time the filtered AC power signal drops below a threshold value, which occurs every trailing edge of the AC_P signal and leading edge of NO_AC. The latched full-scale count represents the duration of a half-cycle of the filtered AC power signal. As the frequency of the filtered AC power signal varies, the full-scale count will vary, but will always represent one-half of the input period of the filtered AC power signal (i.e., will represent a half cycle). The full-scale count stored in the latch 145 is supplied to a digital-to-analog converter (DAC) 147 that converts this count into a full-scale analog voltage. An integrating amplifier 149 receives this full-scale analog voltage and operates to generate a reference voltage DACREF on its output that is of a magnitude necessary to make the DAC 147 output equal to the reference input of the integrating amplifier 149, with this reference voltage DACREF being supplied to a reference input of the DAC 147. The output of the integrating amplifier is used as the reference of the DAC 147 which controls the weighting of the digital bits of the input supplied to the DAC, which in this case is the full-count value stored in the latch 145. This closed loop control system forces the output of the full-count DAC 147 to be a constant voltage equal to the integrating amplifier's reference, regardless of the full-count value provided to the DAC from the latch 145.

In contrast to the full-scale counter 139, the conduction angle counter 143 generates a conduction angle count having a value indicating the portion of the AC half cycle that the dimmer circuit 113 supplies the AC power signal to the filter 110. To do this, the conduction angle counter 143 counts only when the AC_P signal is active, which is true only when the filter AC power signal is being supplied during an AC half cycle and corresponding to when the filtered AC power signal exceeds the threshold of the AC detector 108. A latch 151 stores the conduction angle count generated by the counter 143. The conduction angle counter 143 and latch 151 are reset every time the filtered AC power signal drops below the threshold value of the AC detector 108, which corresponds to when the NO_AC signals goes active and the AC_P signal goes inactive. The conduction angle count represents the duration of the conduction angle of the filtered AC power signal, that is, the time the filtered AC power signal exceeds the threshold value of the AC detector circuit 108. The latched conduction angle count in the latch 151 is output to a second DAC 153 which receives the same DAC reference from the output of the integrating amplifier 149 as does the full count DAC 139. The analog voltage generated by the conduction angle DAC 153 responsive to the conduction angle count corresponds to the CV signal. In this way, the CV signal generated by the conduction angle DAC 153 is a voltage representative of the conduction angle in proportion to the full-scale count voltage corresponding to the voltage output by the full-scale DAC 139e. If, for example, the conduction angle is exactly half of the AC half-cycle (¼ of a full cycle of the filtered AC power signal), the output of the conduction angle counter 143 will be one-half the full-scale count from the counter 139 and the output CV from the DAC 153 will be one-half the voltage output from the full-scale DAC 147. The advantage of this circuit 114 is that it automatically adjusts for input AC frequency variations, and updates every AC half-cycle.

The CV signal generated by the conduction angle DAC 153 is applied through a scaling buffer 122 to generate the REF signal that is input to the current control loop 104 to adjust a setpoint or reference value that determines the average current to be supplied to the single string of LEDs 106. In this way, the average value of the current to be supplied to the string of LEDs 106 is adjusted to allow for dimming of the LEDs. The control voltage signal CV is also supplied to a PWM output dimming circuit 116 which also includes a triangle wave oscillator 118. In response to the triangle wave and CV signal, a differential amplifier or comparator 119 generates an output signal PWMOUT that is applied to power transistor 120 connected in series with the single LED string 106. The PWMOUT signal functions to pulse width modulate the power transistor 120 connected in series with the string of LEDs 106 to thereby dim the light being provided by these LEDs.

In another embodiment of the control circuit 100, the conduction angle to voltage converter 114 is formed from an analog low pass filter, such as a series connected resistor and capacitor where the control voltage CV is developed across the capacitor.

Figure 2:
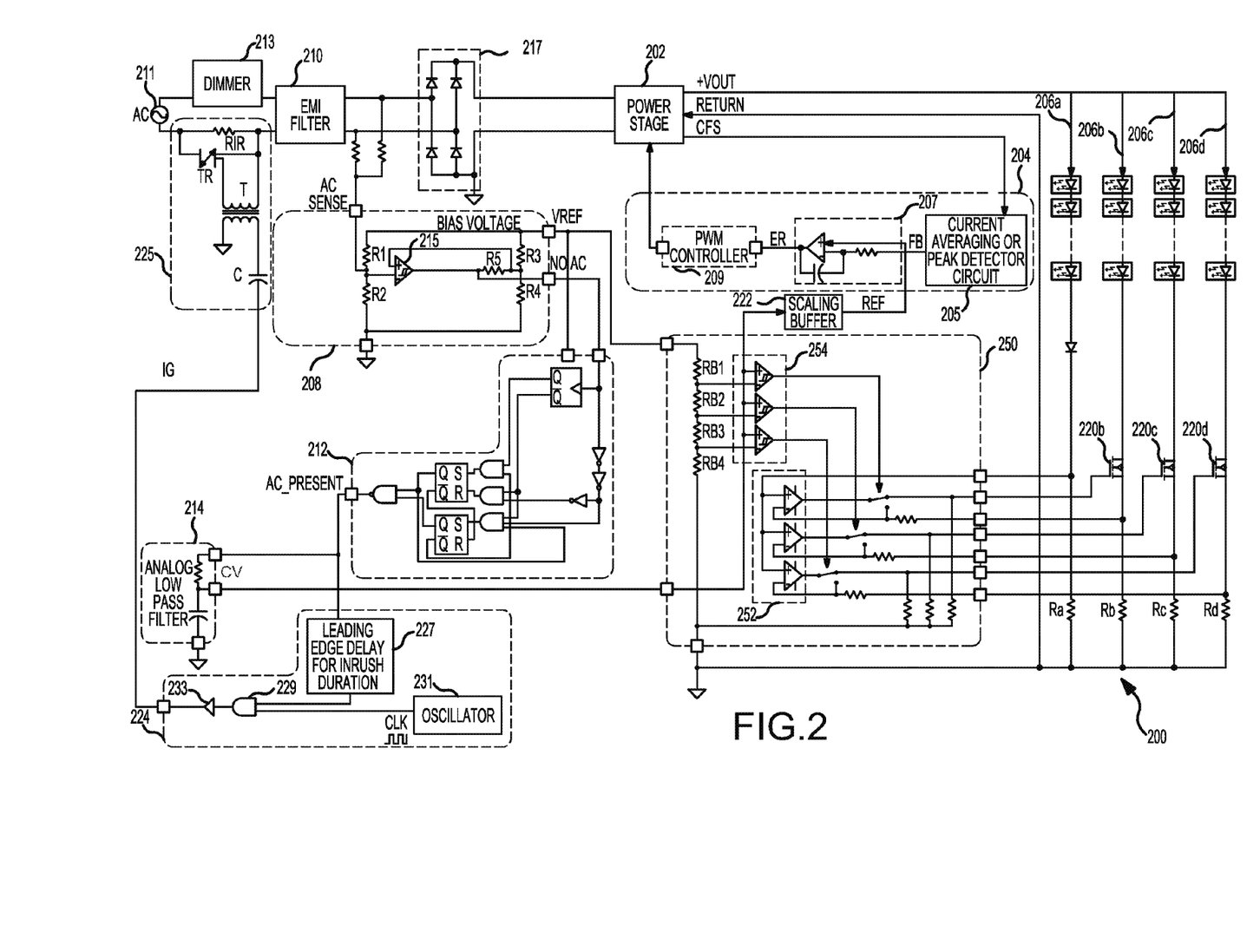
FIG. 2 is a functional block diagram of an LED control circuit that is compatible with conventional dimmer circuits for controlling multiple strings of LEDs according to another embodiment of the present invention.

FIG. 2 illustrates an LED control circuit 200 for controlling multiple parallel-connected LED strings 206a-d according to a second embodiment of the present invention. Components in the circuit 200 that operating the same way as corresponding components of the circuit 100 of FIG. 1 have been given corresponding reference numbers and will not again be described in detail with reference to these figures. The control circuit 200 includes a conduction angle to voltage converter 214 that is formed by a low pass filter including a series-connected resistor R and capacitor C, although the filter circuit 114 previously described is also applicable. The voltage across the capacitor C corresponds to the control voltage CV. The converter 214 receives the AC_Present signal from the zero-crossing blanking circuit 212 and converts this signal into the CV signal having a value that is a function of the duty cycle of the AC_Present signal, which has a duty cycle corresponding to the duration of a half cycle of filtered AC power signal the that dimmer circuit 213 supplied the AC power signal to the filter 210. The LED control circuit 200 further includes a linear on/off control circuit 250 that operates to ensure that the same current flows through each of the LED strings 206a-d, as will be explained in more detail below.

Where multiple strings of LEDs are connected in parallel there is no guarantee that the current flowing through each of these strings will be identical due to variations in parameters of the LEDs among the strings, such as forward voltages of the LEDs. To ensure that each of the strings of LEDs 206a-d has the same current and thus provides the same color of light, the circuit 200 includes the linear on/off control circuit 250. The circuit 250 includes a bank of unity gain buffers 252 that function to ensure that the same current flows through each of the strings of LEDs 206a-d. More specifically, the unity gain buffers 252 ensure that the voltage across a resistor Ra coupled in series with the string of LEDs 206a is the same as the voltages across resisters Rb-Rd coupled in series with the strings of LEDs 206b-d, respectively. If the values of the resisters Ra-Rd are equal, then this means that the current flowing through each of the strings of LEDs 206a-d will be the same. The circuit 250 further includes N−1 comparators 254 that each receive on a first input a bias voltage generated by applying VREF from the AC detector 208 through series-connected bias resistors RB1-RB4. The control signal CV is applied to a second input of each comparator 254. In operation, the comparators 254 and buffers 252 in the circuit 250 perform dimming by reducing the current in proportion to the number of strings of LEDs 206, which is four strings 206a-d in the example of FIG. 2. If more dimming is necessary, the on/off control circuit 250 turns off LED strings 206a-d one at a time to achieve the desired dimming. The LED strings 206b-d include power switches 220b-d, respectively, that are controlled by the on/off control circuit 250 to dim the LED strings 206 as required.

The on/off control circuit 250 receives the same reference voltage VREF used by the circuits 208, 212, and 214 that generate the signal CV. This reference voltage is divided down by resistors RB1, RB2, RB3, and RB4 to form thresholds representing 25%, 50%, 75% and 100% of the reference voltage. This ratio and number of resistors would obviously change depending on the number of LED strings 206 being controlled. The number of resistors RB in the divider string equals the number of LED strings 206 being controlled, and the number of thresholds generated by these resistors is one less. These thresholds are compared to the signal CV by comparators 254. At full AC conduction angle, the CV signal is at its maximum value and is approximately equal to the reference voltage VREF. As the dimmer circuit 213 reduces the AC conduction angle, the value of the signal CV decreases, and the total current through the LEDs is reduced in proportion. When the signal CV is reduced below the first threshold (75% of VREF in this example), the output of the corresponding buffer 252 is disabled and switching device 220b is turned OFF interrupting the current flow through that LED string. At this point the remaining current in that string 206b is diverted to the other LED strings 206, bringing the current in each remaining LED string back up to the 100% level. Since each string 206 had 75% of its original current, when one is turned off, its current equally divides among the remaining strings (75%+75%/3=100%). Prior to turning OFF the one LED string 206b, each string was at 75% current, and therefore at a reduced intensity near 75%. When the string 206b is turned OFF, the remaining strings 206a, 206c, 206d revert to full intensity, but since there are now three strings instead of four, the intensity is reduced to 75%.

In actuality, there is not a 1:1 ratio between LED current through the strings 206 and intensity of light from the LED strings. In the resistor divider formed by resistors RB1-4, the ratios of resistor values will require adjustment to force the LED intensity to remain constant when an LED string 206 is turned OFF. Otherwise there will be a step intensity shift when an LED string is turned OFF. As the AC conduction is further reduced, the total current through the LED strings 206 is also reduced. When the next threshold, at 50% of the original full current, is reached, a second LED string 206c is turned OFF in the same manner as just described for the first string 206b that is turned OFF (i.e., switching device 220c turns OFF). The remaining current in the LED string 206c that is being turned OFF is diverted to the two LED strings 206a and 206d that are still turned ON. The two remaining strings 206a and 206d now conduct 50% of the original current and are now back at full intensity, but since the number of strings operating is now one-half of the original number, the intensity has been reduced by one-half. The third LED string 206c is turned OFF via switching device 220d in the same manner as the first two when CV reaches the last threshold at 25% of VREF. Again the remaining LED string 206a assumes the full current now at 25% of the original. Further dimming just reduces the current in the last LED string 206a until the intensity reduces to zero at zero current. This method of dimming, i.e., turning OFF or dropping out LED strings 206 as the desired light intensity is lowered, reduces the current variation through each LED string so that the color temperature of the emitted light is less affected than if the current was simply reduced from maximum to zero in each string.

Note that the EMI filters 110, 210 in the LED control circuit 100 of FIG. 1 and the LED control circuit 200 of FIG. 2, need not be included in these embodiments. The same is true for other embodiments of the present invention. The EMI filter 110, 210 is generally advantageous and would typically be used in practical embodiments, but the filter is not necessary to the operation of the LED control circuit 100, 200.

LED lighting is on the verge of displacing conventional incandescent lighting for general purpose illumination. One problem with LED lighting is that it is not presently compatible with the large installed base of dimmers common in all households and many industrial installations. Embodiments of this invention provide backward compatibility with incandescent lighting for new LED light bulbs/fixtures using installed dimmers.

LED drivers/ballasts must convert a voltage source to a current source to be compatible with LED drive requirements. For constant light intensity and color fidelity, the LED current must remain constant (ignoring temperature dependence), even with a varying input voltage. Incandescent wall dimmers operate by controlling the conduction angle of the AC input voltage waveform, effectively removing symmetric sections of it to reduce the RMS value of the voltage. Without dimming compatibility circuitry, the LED driver will continue to provide the same constant current to the LED even as the wall dimmer reduces the RMS voltage. Furthermore, the capacitive input of the LED driver, unlike the resistive filament of an incandescent bulb, causes an inrush current every half-cycle when the dimmer conducts. Although generally non-destructive, it does produce an undesirable audible hum.

The first embodiment of the present invention deals with single string LED applications as shown in FIG. 1, and the second embodiment deals with multi-string LED applications as shown in FIG. 2. The difference between the two applications is in the nature of how the LED strings are dimmed. The remainder of the circuitry is common between them.

Incandescent wall dimmers, particularly those used for the residential market, are typically leading edge modulated devices as required by the use of a triac as the switching device. AC voltages, by character, cross zero volts twice during each cycle. The triac commutates (turns-off) whenever its current drops below the sustaining level required to maintain conduction. The triac requires a gate turn-on signal after each zero crossing in order to be turned on, or conducting, during the following half-cycle. If no gate signal occurs, the triac commutates and remains off. Dimming is accomplished by delaying the gate signal by various degrees after the AC voltage zero crossing. With no delay, the triac conducts the full half-cycle. As the delay increases, a piece of the AC voltage is blocked from reaching the load, reducing the RMS voltage reaching the load. At maximum delay, the full half-cycle is blocked and the RMS voltage is zero.

The first step in making an LED driver compatible with incandescent wall dimmers is to detect the conduction angle the wall dimmer allows. The AC detector circuit detects when the AC voltage drops below a specified value on an instantaneous basis (as opposed to an average or RMS basis). By definition the detector indicates the AC zero crossing as well as any larger AC outages. The zero crossing events may be ignored to simplify the downstream circuitry. The details of one embodiment of the detector circuit are shown in FIG. 1. The detector provides a pulsed signal whose duty cycle is proportional to the conduction angle. At maximum conduction, the duty cycle is near 100%, depending on whether or not the zero crossings are blanked out or not. At minimum conduction, the duty cycle is near 0%. The AC detector's output is passed through a low pass filter "B" to develop a voltage proportional to duty cycle, and hence conduction angle. This voltage is scaled appropriately and used as the reference for the current feedback signal that controls the LED current in PWM "E". As the AC conduction decreases from maximum to minimum, the reference voltage derived from the AC detector and low pass filter decreases in a linear manner.

This in itself is not adequate to control the LED current if color rendition is to be maintained. For constant color rendition, the current through the LEDs must maintain magnitude, so the only way to dim the LEDs and maintain color rendition is to PWM the LED string. As the average current through the LEDs is reduced, the light intensity is reduced, but the magnitude of current is maintained while the LEDs are on, thereby maintaining the color. To achieve this, the output of the low pass filter is used as a reference signal to be compared to a sawtooth waveform from oscillator "C" to create a PWM signal "D" that can be used to control a switch in series with the LED string. This technique may be used in conjunction with the components described in detail in the U.S. patent application Ser. No. 12/002,611, which describes an indirect method of controlling the LED load current.

Since the reference and LED switch PWM signal are both derived from the conduction angle information, they are linearly related and matched so that dimming is achieved while maintaining color rendition. In another LED control circuit for dimming LEDs according to an embodiment of the present invention, no PWM dimming is required. In this embodiment, components 116, 118, and 120 of FIG. 1 may be omitted. In operation of this embodiment, the current through the LED string 106 is reduced in proportion to the AC conduction angle (i.e., in proportion to duty cycle of the AC_P signal) without PWM dimming.

For multiple LED string applications, a different technique is used as shown in the embodiments of FIG. 2. The LED strings are not controlled by PWM techniques. Instead, the LED current is reduced first in proportion to how many LED strings are present. If there are four strings, for example, the LED current is varied by a maximum of 25%. If more dimming is required, one string is turned off, and the current flows through the remaining three strings. Further current reduction occurs as more dimming is needed until the level is reduced by a further 33%. At this point another LED string is turned off and the current diverts to the remaining two strings, and so on. This method of dimming has less effect on color rendition degradation than just current reduction alone because the current through each LED string is varied much less. As the number of LED strings is increased, the current variation through the LED strings is reduced. For example, at 10 strings, the current variation is only 10%.

For multiple LED strings in parallel it is necessary to add circuitry that forces current in each string. If all of the LEDs are the same type/color, then the currents would be equal. If different LED types/colors are used in different strings, the current in each string may be different, but still regulated. This necessitates that each current string be configured with an individual current source, or that there is one master LED string and the others are forced to match the current through the master. So, n−1 current sources are needed, where n is the number of LED strings. Circuit element G in FIG. 2 provides linear control for each current source as well as the on/off control to turn each LED string on or off in succession as the current increase or decreases above/below a preset threshold.

Another aspect of compatibility with wall dimmers that must be considered is the capacitive nature of the LED driver input. When the dimmer starts conducting at any time other than near zero crossing, there is a significant change in voltage over a very short duration resulting in a large dv/dt. The large dv/dt quickly charges the input capacitance of the LED driver causing a significant spike of current. The invention mitigates this by controlling a switch (triac, back-to-back FETs/IGBTs, etc.) in parallel with an inrush limiting resistive element "H". The switching device must be controlled through a level shifting or isolation device since the circuits do not share a common ground reference. The AC detector indicates when the dimmer begins conducting, and after a delay to allow the input capacitors to charge in a controlled manner through the resistive element, gates the switch on to bypass the resistive element. Using this technique allows a higher resistance element to control the inrush without having excessive power dissipation if the resistive element were not bypassed after the inrush event was over. The inrush controller "F" produces a pulsed DC quasi-square wave that can be coupled through a transformer or other isolation device to control the inrush bypass switch "H". For switch elements such as FETs or IGBTs that require a DC gating signal, the output of the gate coupling transformer, depicted in FIG. 2, may be rectified and applied to the device's gate.

Figure 3:
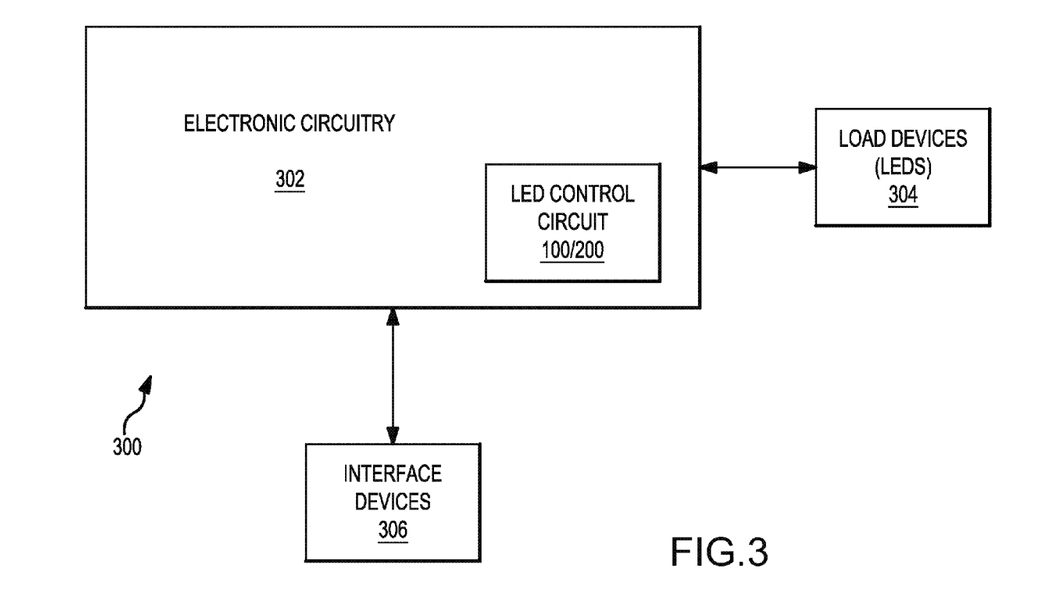
FIG. 3 is a functional block diagram of a lighting system including one or both of the LED controls circuits of FIGS. 1 and 2 according to another embodiment of the present invention.

FIG. 3 is a functional block diagram of an electronic system 300 including one or more of the LED control circuit 100 FIG. 1 and/or the LED control circuit 200 of FIG. 2 according to an embodiment of the present invention. The electronic system 300 includes electronic circuitry 302 which, in turn, contains the control circuits 100/200. The circuits 100/200 drive load devices 304 that correspond to the single string of LEDs 106 or multiple strings of LEDs 206a-n. The electronic circuitry 302 may correspond to a variety of different types of circuitry depending upon the particular application for which the drive circuit 200/300 is being utilized. For example, in one embodiment the electronic circuitry 302 corresponds to an industrial lighting system. The system 300 further may further include interface devices 306 that may take a variety of different forms and which function to allow a user to interface with the system. For example, where the electronic circuitry 302 is lighting circuitry the interface devices 306 may be switches or dimmer circuits 113/213 which allow a user to control the LEDs 304 ON and OFF and control the intensity or brightness of the light being provided by the LEDs.

In the present description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Finally, the operation of well-known components and/or processes has not been shown or described in detail below to avoid unnecessarily obscuring the present invention.

What is claimed is:

1. A dimming control circuit for dimming at least one light emitting diode responsive to an AC power signal from a dimming circuit, the control circuit comprising:
   a power stage adapted to receive the AC power signal and coupled to each light emitting diode, the power stage operable responsive to first control signals to provide current to each light emitting diode;
   a current control loop circuit coupled to the power stage and operable to control the power stage to provide current to each of the light emitting diodes, the current having a value determined by a control value signal;
   an AC detector coupled to the power stage and operable to detect an instantaneous value of the AC power signal and to generate an AC presence signal indicating whether the AC power signal is present or absent; and
   a current control circuit operable responsive to the AC presence signal to generate the control value signal that is applied to the current control loop to control the current through each light emitting diode via the control value signal and achieve the desired dimming, and the current control circuit further operable to limit inrush current from the AC power signal.

2. The dimming control circuit of claim 1 wherein the AC detector is operable to deactivate the AC presence signal responsive to the instantaneous value of the AC power signal reaching a threshold value and to activate the AC presence signal responsive to the instantaneous value of the AC power signal being less than the threshold value.

3. The dimming control circuit of claim 1 wherein the control circuit is operable to control dimming of a single light emitting diode string.

4. The dimming control circuit of claim 3 wherein the current control circuit comprises:
   a conduction angle to voltage converter coupled to the AC detector to receive the AC presence signal, the converter operable responsive to the AC presence signal to generate the control value signal indicating the conduction angle of the AC power signal, the converter applying the control value signal to the current control loop;
   a zero-crossing blanking circuit coupled to the AC detector to receive the AC presence signal, the zero-crossing blanking circuit operable to generate a zero-blanked AC present signal responsive to the AC presence signal, the zero-blanked AC present signal going inactive when the AC presence signal remains inactive for longer than a delay time and the zero-blanked AC present signal going active when the AC presence signal goes active within the delay time;
   a PWM output dimming circuit coupled to the conduction angle to voltage converter to receive the control value signal and operable responsive to the control value signal to generate a PWM output signal adapted to pulse width modulate current flowing through the single light emitting diode string;
   an inrush limiting circuit operable responsive to an inrush gate signal to either place a resistive element in the path of the AC power signal or remove the resistive element from the path of the AC power signal; and
   an inrush control circuit coupled to the inrush limiting circuit and operable responsive to the zero-blanked AC present signal to generate the inrush gate signal to control the inrush limiting circuit to place the resistive element in the path of the AC power signal when the zero-blanked AC present signal is inactive and to remove the resistive element from the path of the AC power signal when the zero-blanked AC present signal is active.

5. The dimming control circuit of claim 4 wherein the conduction angle to voltage converter comprises a low pass filter.

6. The dimming control circuit of claim 5 wherein the low pass filter comprises an analog filter including resistive and capacitive elements.

7. The dimming control circuit of claim 5 wherein the low pass filter comprises a digital low pass filter.

8. The dimming control circuit of claim 7 wherein the digital low pass filter comprises:
   a full-scale counter circuit operable to develop a full-scale count responsive to the AC presence signal;
   a conduction angle counter circuit operable to develop a conduction angle count responsive to the AC presence signal;
   a first latch circuit coupled to the full-scale counter circuit;
   a second latch circuit coupled to the conduction angle counter circuit;
   a first logic circuit coupled to the full-scale counter circuit and the first latch circuit and operable responsive to the AC presence signal to control the full-scale counter circuit to develop a new value for the full-scale count each half cycle of the AC power signal and to store this value in the first latch circuit;
   a second logic circuit coupled to the conduction angle counter circuit and the second latch circuit and operable responsive to the AC presence signal to control the conduction angle counter circuit to develop a new value for the conduction count each half cycle of the AC power signal and to store this value in the second latch circuit;
   a first digital-to-analog converter coupled to the first latch circuit to receive the full-scale count and having a reference input, the first digital-to-analog converter operable to develop a full-scale analog signal having a value that is a function of the full-scale count;
   a second digital-to-analog converter coupled to the second latch circuit to receive the conduction angle count and having a reference input, the second digital-to-analog converter operable to develop the control value signal having a value that is a function of the conduction angle count; and
   an amplifier circuit having a first input coupled to receive the full-scale analog signal and a second input adapted to receive a reference voltage, the amplifier circuit having an output coupled to the reference inputs of the first and second digital-to-analog converters and operable to develop a digital-to-analog converter reference signal on the reference inputs, the digital-to-analog converter reference signal having a value that causes the first digital-to-analog converter output to drive the full-scale analog signal to a value equal to the reference voltage.

9. The dimming control circuit of claim 1 wherein the power stage comprise a Buck converter.

10. The dimming control circuit of claim 1 wherein the dimming control circuit is operable to control dimming of a plurality of parallel-connected light emitting diode strings.

11. The dimming control circuit of claim 9 wherein the current control circuit comprises:
   a zero-crossing blanking circuit coupled to the AC detector to receive the AC presence signal, the zero-crossing blanking circuit operable to generate a zero-blanked AC present signal responsive to the AC presence signal, the zero-blanked AC present signal going inactive when the AC presence signal remains inactive for longer than a delay time and the zero-blanked AC present signal going active when the AC presence signal goes active within the delay time;

an inrush limiting circuit operable responsive to an inrush gate signal to either place a resistive element in the path of the AC power signal or remove the resistive element from the path of the AC power signal;

an inrush control circuit coupled to the inrush limiting circuit and operable responsive to the zero-blanked AC present signal to generate the inrush gate signal to control the inrush limiting circuit to place the resistive element in the path of the AC power signal when the zero-blanked AC present signal is inactive and to remove the resistive element from the path of the AC power signal when the zero-blanked AC present signal is active;

a conduction angle to voltage converter coupled to the zero-crossing blanking circuit to receive the zero-blanked AC present signal and operable responsive to the zero-blanked AC present signal to develop the control value signal;

a plurality of power switches, each power switch being coupled in series with a respective light emitting diode string; and a linear on/off control circuit coupled to said conduction angle to voltage converter to receive the zero-blanked AC present signal and coupled to the power switches, the on/off control circuit operable to ensure that the same current flows through each of the parallel-connected light emitting diode strings.

12. The dimming control circuit of claim 11 wherein the on/off control circuit comprises:

N first resistive elements, each first resistive element coupled in series with each light emitting diode string, each resistive element having substantially the same resistance value;

N second resistive elements coupled in series between a bias voltage source to develop N−1 reference voltages on nodes defined at the interconnection of the series-connected second resistive elements, and where the number of light emitting diode strings equals N;

N−1 comparators, each comparator receiving the control value signal on a first input and a respective one of the reference voltages on a second input and operable to develop a first switch control signal responsive to the control value signal and corresponding reference voltage;

N−1 first switching devices, each first switching device coupled in series with a corresponding one of the light emitting diode strings and having a control input, each first switching device operable responsive to an active first control signal on the control input to couple the corresponding string between the power stage and a reference voltage source and responsive to an inactive first control signal to isolate the light emitting diode string from one of the power stage and the reference voltage source;

N−1 unity gain buffers, each buffer being coupled to receive one a first input a first reference voltage developed across the same one of the first resistive elements and to receive on a second input a sense voltage developed across a respective one of the other first resistive elements, and each buffer operable to develop a switch control signal on an output responsive to the first reference voltage and the sense voltage across the corresponding other first resistive element; and N−1 second switching devices, each second switching device being coupled between the output of a corresponding unity gain buffer and the control input of a corresponding first switching device, and having a control input coupled to the output of a corresponding comparator.

13. A method of dimming at least one string of series-connected light emitting diodes being power by a power stage, the method comprises:

controlling the conduction angle of an AC power signal, the AC power signal having a half cycle;

calculating a full-scale count value associated with a half cycle of the AC power signal;

calculating a conduction angle count value corresponding to the actual portion of each half cycle of the AC power signal that is supplied to each string of series-connected light emitting diode;

from the conduction angle and full scale count values, generating a control signal; and from the control signal, deriving a set point value that adjusts the operation of the power stage to dim the strings of series-connected light emitting diodes corresponding to the conduction angle.

14. The method of claim 13 wherein one string of series-connected light emitting diodes is controlled.

15. The method of claim 13 wherein a plurality of series-connected light emitting diodes are controlled to ensure that substantially the same current flows through each string of series-connected light emitting diodes.

16. The method of claim 13 further comprising limiting inrush current from the AC power signal in response to the conduction angle and zero-crossings of the AC power signal.

17. An electronic system, comprising:

electronic circuitry coupled to at least one light emitting diode string, the electronic circuitry including a dimming control circuit for dimming at least one light emitting diode responsive to an AC power signal from a dimming circuit, the control circuit comprising:

a power stage adapted to receive the AC power signal and coupled to each light emitting diode, the power stage operable responsive to first control signals to provide current to each light emitting diode;

a current control loop circuit coupled to the power stage and operable to control the power stage to provide current to each of the light emitting diodes, the current having a value determined by a control value signal;

an AC detector coupled to the power stage and operable to detect an instantaneous value of the AC power signal and to generate an AC presence signal indicating whether the AC power signal is present or absent; and a current control circuit operable responsive to the AC presence signal to generate the control value signal that is applied to the current control loop to control the current through each light emitting diode via the control value signal and achieve the desired dimming, and the current control circuit further operable to limit inrush current from the AC power signal.

18. The electronic system of claim 17 wherein the electronic circuitry comprises an industrial lighting system.

19. The electronic system of claim 18 further comprising at least one interface device coupled to the electronic circuitry.

20. The electronic system of claim 19 wherein at least some of the interface devices comprise switches.

* * * * *

UNITED STATES PATENT AND TRADEMARK OFFICE
CERTIFICATE OF CORRECTION

| | | |
|---|---|---|
| PATENT NO. | : 8,022,634 B2 | Page 1 of 1 |
| APPLICATION NO. | : 12/366642 | |
| DATED | : September 20, 2011 | |
| INVENTOR(S) | : Fred Greenfeld | |

It is certified that error appears in the above-identified patent and that said Letters Patent is hereby corrected as shown below:

- In Claim 9, Column 12, Line 53 of the patent, please change the text "power stage comprise a Buck converter." to -- power stage comprises a Buck converter. --.

- In Claim 12, Column 13, Line 55 of the patent, please change the text "receive one a first input" to -- receive on a first input --.

- In Claim 13, Column 14, Lines 6 and 7 of the patent, please change the text "light emitting diodes being power by a power stage, the method comprises:" to -- light emitting diodes being powered by a power stage, the method comprising: --.

- In Claim 13, Column 14, Line 15, please change the text "light emitting diode:" to -- light emitting diodes; --.

Signed and Sealed this
Fifteenth Day of November, 2011

David J. Kappos
*Director of the United States Patent and Trademark Office*